(12) United States Patent
Erm

(10) Patent No.: US 10,462,301 B2
(45) Date of Patent: Oct. 29, 2019

(54) CALL INTENT NOTIFICATION FOR ESTABLISHING A CALL

(71) Applicant: Microsoft Technology Licensing, LLC, Redmond, WA (US)

(72) Inventor: Tanel Erm, Tallinn (EE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/050,629

(22) Filed: Jul. 31, 2018

(65) Prior Publication Data

US 2018/0338043 A1    Nov. 22, 2018

Related U.S. Application Data

(63) Continuation of application No. 15/337,463, filed on Oct. 28, 2016, now Pat. No. 10,097,691.

(51) Int. Cl.
| | | |
|---|---|---|
| *H04M 3/42* | (2006.01) | |
| *H04M 3/54* | (2006.01) | |
| *H04M 7/00* | (2006.01) | |
| *H04M 7/12* | (2006.01) | |
| *H04L 29/08* | (2006.01) | |

(52) U.S. Cl.
CPC ......... *H04M 3/54* (2013.01); *H04M 3/42263* (2013.01); *H04M 3/42374* (2013.01); *H04M 7/0006* (2013.01); *H04M 7/1225* (2013.01); *H04M 7/1285* (2013.01); *H04L 67/26* (2013.01); *H04M 7/0048* (2013.01); *H04M 7/0054* (2013.01)

(58) Field of Classification Search
CPC ............................ H04M 3/54; H04M 3/42263
USPC .................. 379/211.01, 211.02, 212.01, 219
See application file for complete search history.

(56) References Cited

U.S. PATENT DOCUMENTS

| | | | |
|---|---|---|---|
| 6,819,667 B1* | 11/2004 | Brusilovsky | ...... H04L 29/06027 370/354 |
| 7,613,170 B1 | 11/2009 | Grabelsky et al. | |
| 2009/0086950 A1* | 4/2009 | Vendrow | ............... H04M 3/493 379/202.01 |
| 2011/0312321 A1 | 12/2011 | Ramachandran et al. | |
| 2014/0040175 A1 | 2/2014 | Sundararajan et al. | |
| 2016/0165570 A1 | 6/2016 | Kim et al. | |
| 2017/0041742 A1* | 2/2017 | Toksvig | .................. H04W 4/12 |

OTHER PUBLICATIONS

"Final-Office Action Issued in U.S. Appl. No. 15/347,622", dated Feb. 4, 2019, 17 Pages.

* cited by examiner

*Primary Examiner* — William J Deane, Jr.
(74) *Attorney, Agent, or Firm* — NovoTechIP International PLLC

(57) ABSTRACT

Techniques for call intent notification for establishing a call are described. According to one or more implementations, a user of a first user terminal attempts to establish a call with a second user terminal. Based on determining that the second user terminal and/or a user of the second user terminal is not available to answer the call, a call intent notification is sent to the second user terminal. According to one or more implementations, the call intent notification includes a number that enables the second user terminal to establish a call with the first user terminal.

20 Claims, 3 Drawing Sheets

CALL INTENT NOTIFICATION FOR ESTABLISHING A CALL

RELATED APPLICATIONS

This application is a continuation of and claims priority to U.S. patent application Ser. No. 15/337,463, filed on 28 Oct. 2016 and titled "Communication System," which in turn claims priority under 35 U.S.C. 119 or 365 to Great Britain Application No. 1617091.2 filed 7 Oct. 2016, the disclosures of which are hereby incorporated by reference herein in their entirety.

TECHNICAL FIELD

The present disclosure relates to voice calls made over a PSTN network and voice calls made over a packet-switched network.

BACKGROUND

Traditional voice calls can be made via a Public Switched Telephone Network (PSTN). This refers to one or a combination of the world's circuit switched telephone networks, over which users' telephones can addressed based on the standardized system of telephone numbers. PSTN networks include landline networks as well as mobile cellular networks. Thus a mobile phone can make and receive phone calls over the PSTN network, by means of a dialler application installed on the mobile phone which uses a wireless transceiver in the phone to connect to a base station of the cellular network via the voice channel. The dialler application can then connect to another mobile or static terminal over the cellular network (and if not on the same network, onwards via another cellular network or landline network of the PSTN).

It is also known to enable a user to conduct a voice call over a packet-switched network, which may comprise a single proprietary network or a combination of multiple constituent networks. E.g. the packet-switched network may comprise a private intranet such as a company intranet, and/or a wide area internetwork such as that commonly referred to as the Internet. In the case of calls made using Internet Protocol as the packet protocol, such calls are referred to as Voice over Internet Protocol (VoIP) calls. To be able to make or receive a packet-switched call such as a VoIP call, the user at each end has a communication client application installed on his or her respective user terminal (or equivalently uses his or her user terminal to access a server-hosted instance of the client, e.g. a web-hosted instance accessed via a general purpose web browser on the user terminal). The client application uses a network interface on the user terminal to connect to the packet-switched network (e.g. Internet), and thereby establish a communication session with the other user terminal over the packet-switched network.

For packet-switched calls, the user terminal can be a traditional desktop computer, but can also be a mobile terminal such as a smartphone, tablet or laptop, or even a wearable mobile terminal such as a smart watch or pair of smart glasses. The mobile terminal may connect to the packet-switched network (e.g. the Internet) via the data channel of the cellular network, or via a wireless access point of a wireless local area network (WLAN), e.g. via a short-range radio frequency (RF) technology such as Wi-Fi or Bluetooth.

It is also known for a hybrid call to be conducted part way over a PSTN network and part way over a packet-switched network such as the Internet. To achieve this, a gateway is provided between the two different types of network. Thus the user terminal can connect to the gateway by PSTN and the user terminal on the other end of the call can connect to the gateway via the circuit-switched network, or vice versa, with the call being routed via the gateway.

SUMMARY

Techniques for call intent notification for establishing a call are described. According to one or more implementations, a user of a first user terminal attempts to establish a call with a second user terminal. Based on determining that the second user terminal and/or a user of the second user terminal is not available to answer the call, a call intent notification is sent to the second user terminal. According to one or more implementations, the call intent notification includes a number that enables the second user terminal to establish a call with the first user terminal.

A fully packet-switched call may be preferred, e.g. as these tend to be cheaper. On the other hand, a callee may not always be available to receive a packet-switched call. E.g. the callee may not be paying attention to his or her VoIP application, or may not currently have the VoIP application open, or may not be logged in to the VoIP communication service. More generally, similar hurdles may occur in relation to any packet-switched calling service.

In such scenarios a hybrid packet-switched call could be conducted using a gateway, via a PSTN connection between the callee and the gateway and a packet-switched connection between the gateway and the caller (with the gateway preferably being local to endpoint connecting via PSTN). However, there is still the difficulty in establishing the PSTN leg of the call. E.g. if the intended callee does not have the VoIP app open or is not logged in to the VoIP service, then the corresponding instance of the VoIP application on the caller's terminal cannot directly trigger it to establish a call by different means. Or if the intended callee is not paying attention to the VoIP application, then it is no use the caller's VoIP application trying to alert the intended callee to the intention though through the far-end VoIP application. Again, similar hurdles could also apply in relation to other packet-switched calling services.

It would therefore be desirable to provide a mechanism to better facilitate the establishment of an at least partially packet-switched call when the intended callee (or his or her terminal) is not available through the packet-switched calling application.

According to one aspect disclosed herein, there is provided equipment for use in relation to a packet-switched communication service, the packet switched communication service being suitable for establishing a packet-switched call between a first user terminal and a second user terminal over a packet-switched network, with the first user terminal being used by a first user and the second user terminal being used by a second user (but the second user or user terminal not necessarily being available to accept such a call). The equipment may be implemented in the form of a server or the first user terminal, or a combination thereof. Either way, the equipment comprises: an interface for sending a notification to the second user terminal via an out-of-band communication channel not involving said communication service; memory comprising one or more memory units, the memory storing code; and processing apparatus comprising one or more processing units, the processing apparatus being arranged to run the code from said memory. The code is configured so as when run on the processing apparatus to perform operations of: (i) receiving an indication that the first user intends a call with the second user via said communication service; (ii) in response to the receipt of said indication, determining whether the second user terminal is currently unavailable to answer a call through said communication service, and/or determining whether the second user is currently unavailable to answer a call through said communication service; (iii) in response to the receipt of said indication combined with the second user terminal or the second user being unavailable according to said determination, sending a call intent notification to the second user terminal via said out-of-band communication channel, the call-intent notification notifying the second user about the intended call; and (iv) including in the notification a gateway PSTN number enabling the second user terminal to establish a hybrid PSTN call with the first user terminal via a connection between the second user terminal and a gateway over a PSTN network, and via a connection between the gateway and the first user terminal over the packet-switched network using said communication service. Preferably the gateway is local to the second user terminal such that the hybrid call only incurs the cost of a local PSTN call.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
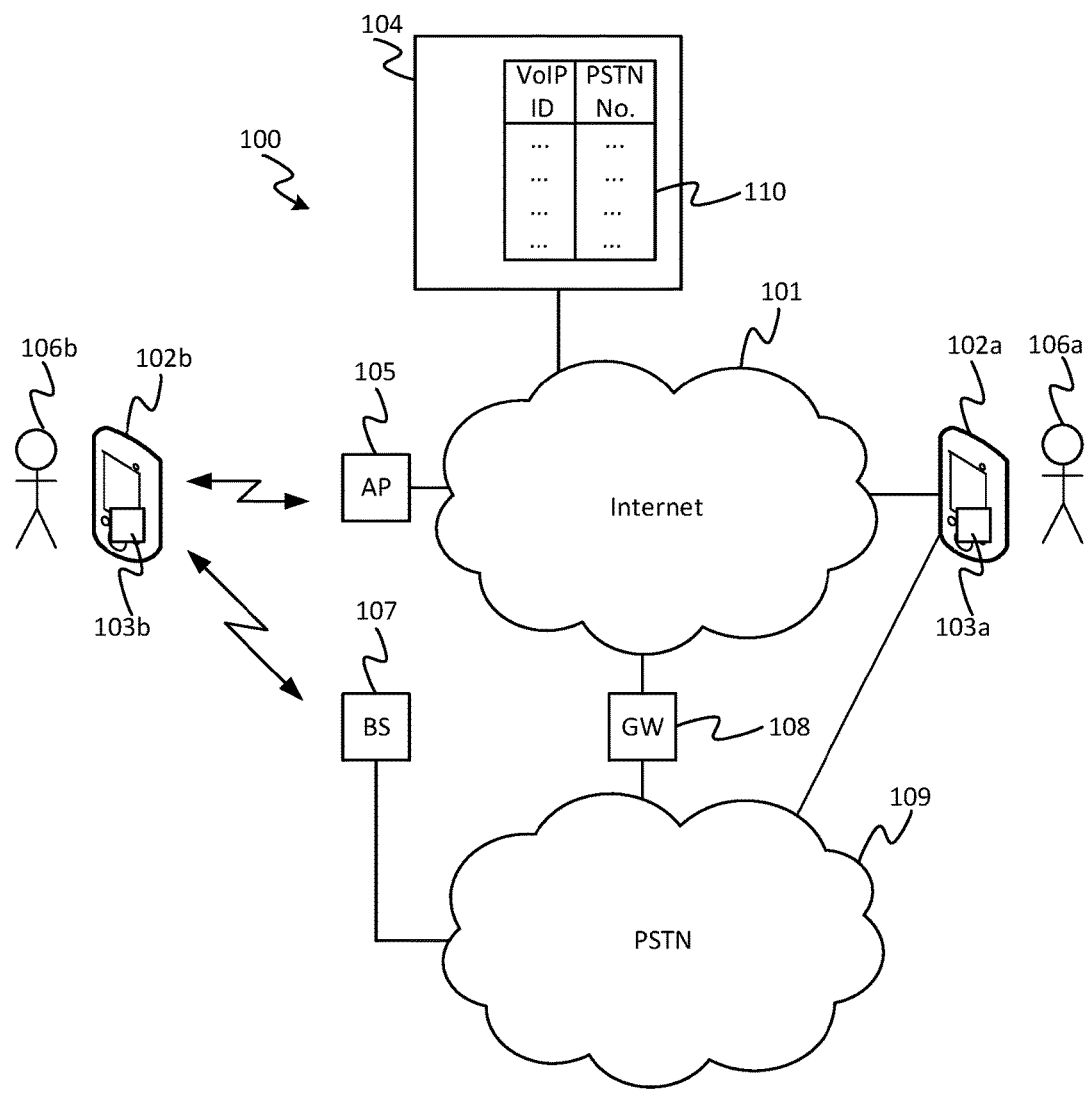
FIG. 1 is a schematic block diagram of a communication system.

According to embodiments disclosed herein, when a VoIP endpoint A is attempting to contact another VoIP endpoint B but direct two-way real-time communication within the VoIP stack is not possible (for example B is unresponsive or is expected to be unresponsive, e.g. due to not running the VoIP app or having no internet connectivity), then an out-of-band notification (e.g. an SMS message or push notification) is sent to endpoint B's telephone device. This notification contains information about A's identity and his or her intent to initiate real-time voice communications, suggesting to call back using the phone network, by providing a temporary shared PSTN access number of a server local to B's telephone number, which is configured to connect a telephone call from B's telephone device to VoIP endpoint A using a three-piece mapping. In embodiments the expiration of the temporary mapping record is extended every time it is used.

The following may be described in relation to VoIP calling applications, but is also applicable to any packet-switched calling applications. Today, many attempted VoIP calls are unsuccessful because the callee is either offline, does not receive the incoming call notification, or does not accept the call in time. Currently the callee is not likely to become aware of the missed call attempt, especially when using a mobile device, and due to a combination of these factors users often resort to pre-scheduling VoIP-to-VoIP calls via other communication channels, or fall back to other channels or applications completely, unduly damaging the perception of the VoIP service's reliability and perceived likelihood of reaching a contact by VoIP. Additionally, sometimes a data connection is simply not available or reliable enough. On the other hand, PSTN to PSTN is often too expensive, especially in international scenarios. Embodiments described herein extend the reach of a VoIP service to users that are not currently using the VoIP application itself on their mobile devices or other devices.

According to embodiments, when a VoIP endpoint A is attempting to contact another VoIP endpoint B but direct two-way real-time communication within that VoIP stack is not possible (e.g. B is unresponsive or expected to be unresponsive, due to e.g. not running the VoIP app or having no internet connectivity), then the following happens. Firstly, a cloud VoIP call control server will issue a request to a notification service about a missed call or other similar call intent, including the VoIP usernames of A and B. The notification service will also request B's mobile phone number from an identity database service, profile database service and contact database service. Further, the notification service will request a shared PSTN access number from a mapping service, passing the A's VoIP username and B's phone number to the mapping service. In response the mapping service retrieves a shared PSTN access number from the same region or country as B's mobile phone number, and enters a three-piece record into the mapping database with a predefined expiry date. The notification service will then issue a request to the messaging service to send out an out-of-band message (e.g. an SMS or push notification) to B's mobile phone. The message will contain information about A's intent to call or be called, suggesting to call back A using the shared PSTN access number provided in the message.

When B calls the shared access number, the PSTN-to-VoIP gateway server behind the access number will request the mapping service to find A's VoIP username. The mapping service will return A's VoIP username based on the combination of what access number was dialled and the PSTN Caller ID of B's phone. The mapping service will also extend the expiration for the three-piece mapping record. The PSTN-to-VoIP gateway then delivers the call to A's VoIP account.

The disclosed mechanism provides the ability to send a missed call notification about a VoIP call to a mobile device which may or may not have the VoIP app installed, which enables an immediate call-back to the original caller's VoIP account over PSTN. The combination of the notification and mapping aspects result in an increase of network reach and reliability, and also cost savings value for PSTN-side users.

Figure 2:
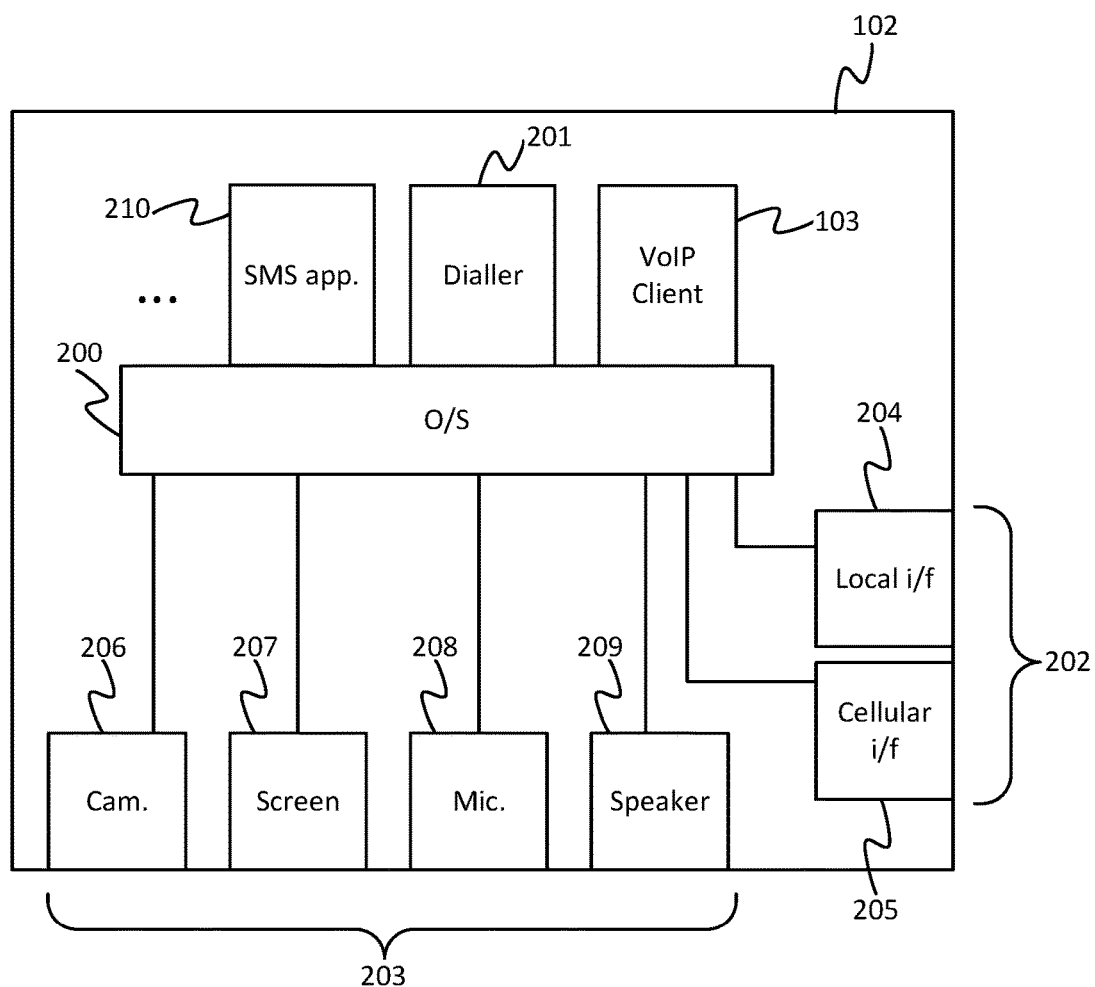
FIG. 2 is a schematic block diagram of a user terminal.
Figure 3:
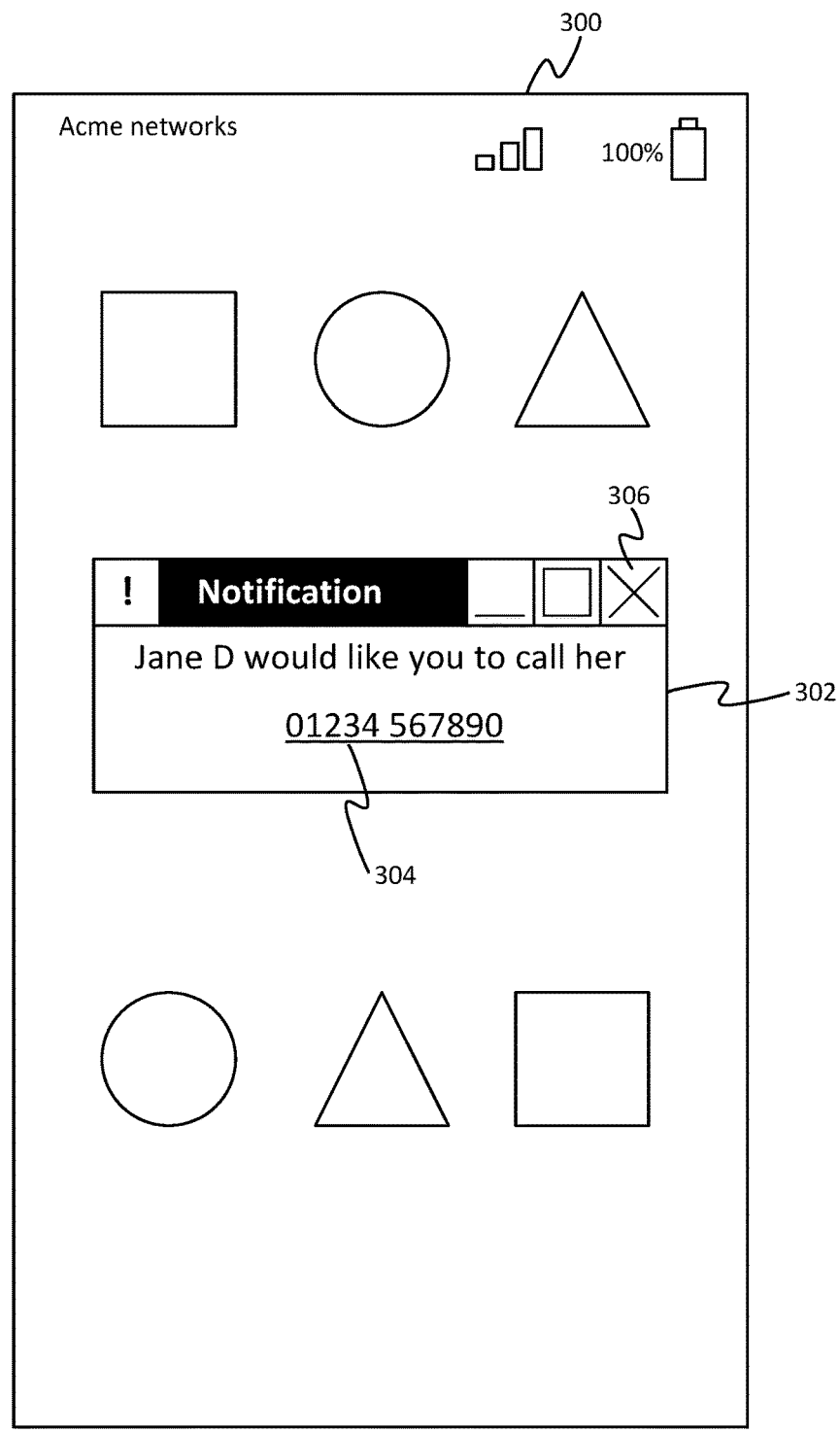
FIG. 3 is a schematic mock-up of a user interface.

Embodiments of the present disclosure are now discussed further with reference to FIGS. 1, 2 and 3.

FIG. 1 shows a communication system 100 comprising: a packet-switched network 101, a PSTN network 109, a first user terminal 102*a* and a second user terminal 102*b*. The packet-switched network 101 may comprise a single proprietary packet-switched network or may comprise a plurality of constituent packet-switched networks. In embodiments the packet-switched network 101 comprises a wide-area internetwork such as the Internet. The PSTN network comprises one or more circuit switched networks, such as one or more mobile cellular networks, and/or one or more landline networks. Each of the first and second user terminals 102a, 102b may take the form of a static user terminal such as a desktop computer, or more preferably a mobile user terminal such as a smartphone, tablet or laptop, or even a wearable mobile user terminal such as a smart watch or a pair of smart glasses. Many other user terminals 102 taking such forms may also be present and participating in the communication system, but for the sake of simplicity these are not illustrated in FIG. 1. Note also that the first and second user terminals 102a, 102b do not necessarily need to take the same form.

Each of the first and second user terminals 102a, 102b is operable to connect to both the packet-switched network 101 and the PSTN network 109.

In embodiments where the second user terminal 102b is a mobile terminal, the second user terminal 102b may be configured to connect to the packet-switched network via a wireless access point 105 of the packet switched network using a wireless access technology, e.g. a short-range RF technology such as Wi-Fi or Bluetooth. E.g. this may be a wireless access point of a wireless local area network (WLAN), such as may be found in the home or office, or in a public place such as a café, bar, hotel, airport, station or train, etc. However, it is not excluded that the second user terminal 102b may connect to the packet-switched network 101 via a wired connection such as via a wired modem or an Ethernet network.

The first user terminal 102a may also be configured to connect to the packet-switched network 101 by any of the means described above in relation to the second user terminal 102b, e.g. via a second wireless access point of a different WLAN in another geographic location, though for the sake of simplicity the second wireless access point is not shown in FIG. 1.

Each of the first and second user terminals 102a, 102b is installed with a respective instance of a communication client application 103a, 103b. The communication client 103, when run on the respective user terminal 102, is operable to establish a live, two-way voice call with the client 103 on another user terminal 102 over the packet-switched network 101, by means of a packet-switched voice calling technology such as VoIP. The voice call may also comprise one or more other media steams in addition to the voice, such as video, instant messaging, screen sharing or virtual whiteboard data.

The following will be described from the perspective of the first user terminal 102a being the near-end user terminal and the second user terminal 102b being the far-end user terminal, though it will be appreciated that this is just a matter of perspective and conversely similar things may be said of the second user terminal 102b in relation to the first user terminal 102a, or indeed other combinations of user terminals 102.

The communication system comprises a server 104 providing a packet-switched communication service comprising a packet-switched voice calling service, e.g. a VoIP service, and optionally one or more associated media communication services such as video calling, instant messaging, screen sharing, or one or more collaborative tools such as a virtual whiteboard. Note that a server as referred to herein refers to a logical entity which may comprise one or more physical server units at one or more geographical sites.

The first user terminal 102a is used by a first user 106a and the second user terminal 102b is used by a second user 106b. Other users of other user terminals (not shown) are also users of the communication service. Each of the users has a user ID (e.g. username) identifying him or her within the communication service. The user IDs are stored in the server 104, where they are mapped to addresses identifying the respective user terminals 102 within the packet-switched network 101 (e.g. IP addresses in the case of the Internet or any other IP-based network).

Conventionally, to instigate a call, the client 103a on the first (near-end) user terminal 102a submits the user ID (e.g. username) of the far-end user 106b to the server 104, in order to look up the address of the far-end user terminal 102b within the packet-switched network 101 (e.g. to look up the IP address). The near-end client 103a then sends a call establishment request from the near-end user terminal 102a to the client 103b on the far-end user terminal 102b, using the address of the far-end terminal 102b which the near-end client 103a looked up on the server 104. If the far-end user 106b chooses to accept the call through his or her respective client 103b, then the far-end client 103b returns a response to the near-end client 103a on the near-end terminal 102a. The two clients 103a, 103b then set up a communication session between them over the packet-switched network 101 in order to exchange live voice data captured from the respective users 106a, 106b, and optionally other accompanying media such as live video of one another in the case of a video call, and/or IM messages typed by the users 106a, 106b, and/or a live screen share so that one of the users 106 can see what is currently being displayed on the screen of the other's terminal 102. The voice and/or other media of the call may be routed via the server 104; or alternatively, having used the server 104 for the address look-up, the call media may be transmitted directly between the first and second user terminals 102a, 102b. A combination of such approaches could also be used (e.g. one route for voice and another for other media such as IM).

Regarding the PSTN network 109, if the second (far-end) user terminal 102a is a mobile user terminal then the PSTN network 109 comprises at least one mobile cellular network that supports a dedicated voice channel (and optionally a general purpose data channel as well). E.g. the mobile cellular network may be a 3GPP network such as a GSM, 3G, LTE, 4G or 5G network, etc. The mobile cellular network comprises a plurality of wireless base stations 107 (sometimes also called node-Bs), one of which is illustrated in FIG. 1. If the second user terminal 102a is within range one of the base stations 107 then it can connect to the PSTN network 109 in order to make traditional cellular voice calls. Note however, it is not excluded that the second user terminal 102a may connect to a wired part of the PSTN network 109 via a wired means such as an old-fashioned landline.

The communication system 100 further comprises a gateway 108 between the packet-switched network 101 and the PSTN network 109, arranged to enable hybrid PSTN/packet-switched calls. The server 104 also stores a database 110 mapping gateway PSTN phone numbers to respective ones of the user IDs (e.g. usernames) which identify users within the packet-switched communication service (e.g. VoIP service). These PSTN phone numbers are all phone numbers of the gateway 108 as far as the PSTN network 109 is concerned. If the far-end user terminal 102b submits one of these telephone numbers to the PSTN network 109, then this will connect the far-end user terminal 102b to the gateway 108 over the PSTN network, via the dedicated voice channel. In turn, the gateway 108 is triggered to look up in the database 110 the respective user ID mapped to the particular PSTN number that was used to dial into the gateway 108, e.g. the user ID of the first user 106a. Based on this, the gateway 108 establishes a communication session between the gateway 108 and the user terminal 102 of the user 106 identified by the user ID given by said look-up, e.g. the near-end user terminal 102a. Thus this allows the far-end user terminal 102b to establish a voice call with the near-end user terminal 102a part way over the PSTN network 109, in a leg between the far-end user terminal 102b and the gateway 108, and part way over the packet-switched network 101, in a leg between the gateway 108 and the near-end user terminal 102a.

Note: the server 104 and gateway 108 as referred to an illustrated herein are logical entities, and in practice may be implemented in separate physical equipment or the same or overlapping physical equipment, which may be implemented in one or more physical units at one or more geographical sites. Distributed computing techniques in themselves are known in the art and may be used to implement such an arrangement.

Optionally, if the mobile cellular network is one which provides a separate, general-purpose data channel in addition to the dedicated voice channel, then this may also provide the near-end terminal 102a and/or far-end user terminal 102b with an alternative or additional means of connecting to the packet-switched network 101.

FIG. 2 illustrates further detail of a user terminal 102. Each of the first and second user terminals 102a, 102b is configured as in FIG. 2.

The user terminal 102 comprises an operating system 200 and a plurality of applications, including: the respective instance of the communication client application 103, a dialler application 201, and one or more other applications 210 such as an SMS application and/or email client, all arranged to run on the operating system 200. The applications 103, 201 and the operating system 200 take the form of software stored on a memory of the user terminal 102 and arranged to run on a processor of the user terminal 102. The memory on which this software is stored may comprise one or more memory units employing one or more memory media, e.g. a magnetic memory medium such as a hard disk, and/or an electronic memory medium such as an EEPROM ("flash" memory), and/or an optical storage medium. The different applications 103, 201, 210 and the operating system 200 may all be stored on the same unit and/or medium of the memory, or on different units and/or memory media of the memory, or some of the same and some different. Further, the processor on which the different applications 103, 201, 210 and operating system are arranged to run may comprise one or more processor units. Various storage and processing arrangements in themselves will be familiar to a person skilled in the art and will not be listed here in detail.

The user terminal 102 also comprises a plurality of user input and output (I/O) devices 203, including at least one audio input device in the form of a microphone 208 and at least one audio output device in the form of at least one speaker 209. Optionally the user I/O device 203 may also comprise one or more further user input devices, e.g. a camera 206, keypad and/or touchscreen; and/or one or more further user output devices, e.g. a display screen 207 (which may also be a touchscreen).

Further, the user terminal 102 comprises a first network interface 204 for connecting to the packet-switched network 101 and a second network interface 205 for connecting to the PSTN network 109. For example, the first interface 204 may comprise a local wireless interface for connecting to the packet-switched network 101 via the access point 105, e.g. using a short-range RF technology such as Wi-Fi or Bluetooth. The second interface 205 may take the form of a mobile cellular interface for connecting to the PSTN network via the base station 107.

In operation, if a packet-switched call (e.g. VoIP call) is being conducted with the far-end user terminal 102b, then the live, incoming call media stream (including at least voice captured from the far-end user 106b) is received through the first network interface 204 and passed to the near-end communication client 103a via the operating system 200. The near-end client 103a decodes this and sends it to the user output device(s) 209, 207 via the operating system 200 to be played out. This includes at least playing out the received voice through the speaker 209, and optionally playing out other media such as playing out video of the far-end user 106b through the screen 207, or displaying IM messages composed by the far-end user 106b on the screen 207. With regard to the live, outgoing call media stream, this includes at least voice captured from the near-end user 106a using the microphone 208, and optionally other media such as video of the near-end user 106a captured through the camera 206, and/or IM messages composed by the near-end user 106a using the touch screen 207 or keypad (not shown). This outgoing media is passed via the operating system 200 to the near-end communication client application 103a which encodes it, then passes the encoded media via the operating system 200 to be sent out through the first interface 204 over the packet-switched network 101 to the far-end user terminal 102b to be played out.

In the case of a PSTN call being conducted with the far-end user terminal 102b or gateway 108, then the call media comprises only voice. The live, incoming voice signal is received through the second interface 205 and passed via the operating system 200 to the speaker 209 to be played out. The live, outgoing voice signal is captured from the near-end user 106a through the microphone, and passed via the operating system 200 to be sent out through the second interface 205 over the PSTN network 109 to the far-end terminal 102b to be played out there. The dialler application 201 handles the user interface allowing the near-end user 106a to enter a phone number to be dialled through the touchscreen 207, keypad or the like; whilst the operating system 200 is responsible for call-set up. Or in an alternative implementation, the dialler 201 could be responsible for setting up the call.

A pure packet-switched call is usually preferred since users often pay only a fixed fee for packet-switched connectivity that is not dependent on the duration or volume of usage, or the packet-switched connectivity may even be free. E.g. the access point 105 may provide free connectivity such as free Wi-Fi (e.g. as a courtesy in a bar or café), or the near-end user 106a may be required to pay to use the access point 105 but only a flat fee (at least for a given period such as a day). Some users also pay for unlimited data via the data channel of their mobile cellular network 109.

On the other hand, sometimes the far-end user 106b cannot be reached by means of a packet-switched call establishment request (e.g. a VoIP call request). For instance, at a given time, the far-end user 106b may only be using a user terminal 102b that is not installed with an instance of the communication client application 103 of the packet-based communication service in question (e.g. the particular VoIP service), or that is not logged in to the communication service (e.g. VoIP service). Either way, this means the far-end user 106b is not currently registered with the server 104 of the packet-switched communication service as being online. Or as another possibility, even if online with the packet-switched communication service, the far-end user 106b may simply not be paying attention to the packet-switched calling client application 103b, e.g. because he or she has it muted and running in a background state.

In these cases, or similar, then if the near-end user 106a attempts to send a call establishment request to the far-end user 106b, requesting establishment of a fully packet-switched call, then this will elicit no response.

To address such situations, according to embodiments disclosed herein, the near-end communication client 103a is configured to automatically detect when the far-end user 106b is unavailable and/or when the far-end user terminal 102b is unavailable to accept a packet-switched call (e.g. unavailable to accept a VoIP call). In embodiments, to detect when the far-end user 106b is unavailable, the near-end client application 103a may be configured to detect when an outgoing call establishment request sent to the far-end instance of the communication client application 103b has gone unanswered for beyond a predetermined threshold length of time (i.e. the outgoing call request has gone on "ringing" too long). Alternatively, the near-end client 103a may be configured to access a presence status of the far-end user 106b from the server 104, the presence status indicating that the far-end user has selected to be unavailable through the particular packet-switched communication service (e.g. VoIP service). In alternative or additional embodiments, to detect when the far-end user terminal 102b is unavailable, the near-end client application 103a may be configured to detect when is the far-end user 106b has no instance of the communication client 103 currently registered with the server 104 as being online. This could mean the far-end user terminal 102b currently being used by the far-end user 106b is not currently installed with an instance 103b of the client application 103, or that the far-end user 106b is not currently logged in to the communication service in question (e.g. the VoIP service). Either way, this means the far-end user terminal 102b cannot be contacted directly via the packet-switched communication service and cannot accept an incoming call through the packet-switched communication service (e.g. VoIP service).

In addition to detecting when the far-end user 106b and/or user terminal 102b is unavailable via the packet-switched communication service (e.g. VoIP service), the near-end client application 103a is also configured to detect when near-end user 106a intends to establish a call with the far-end user 106b. This is detected based on the near-end user 106a actuating a suitable user control in the user interface of the near-end client 103a. In embodiments, the near-end client 103a detects the near-end user's intent when the near-end user 106a selects the usual control to attempt to initiate a conventional packet-switched call with the far-end user 106b. In response to this, the near-end client 103a detects whether the far-end user 106b and/or user terminal 102b is actually available to accept such a call, and if unavailable sends an out-of-band call intent notification to the far-end user terminal 102b instead of a conventional call establishment request of the packet-switched communication service in question (as will be discussed in more detail shortly). Alternatively, the detection as to the availability may be performed first, for example the near-end client 103a being configured to periodically or randomly poll the availability status. In this case, when it is detected that the far-end user 106b or user terminal 102b is unavailable for packet-switched calling, the near-end client 103a may present the near-end user 106a with an alternative user control. This alternative user control, when actuated by the near-end user 106a, causes the out-of-band call intent notification to be sent to the far-end user terminal 102b. For example, the near-end user 103a may be prompted with a control and associated message saying something along the lines of "Colin is offline from the VoIP service at the moment. Would you like to send him a notification asking him to call you back by another means? Yes/No."

The out-of-band call intent notification is sent via an "out-of-band" channel, i.e. a channel other than via the particular packet-switched communication service in question. In embodiments, this means via a communication service provided by a provider (party) other than the party who provides the packet-switched communication service (e.g. an enterprise other that the enterprise that provides the particular VoIP service in question). In embodiments, the out-of-band channel is a channel that does not involve an instance of the communication client application 103 at the far-end user terminal 102b, such that the notification is instead sent to another program on the far-end user terminal (e.g. the operating system 200, dialler app 201 or other application 210). In embodiments, the out-of-band communication channel addresses the far-end terminal 102b by means of an address of an addressing scheme other than the usernames of the particular packet-switched communication service (e.g. a PSTN number or email address instead of the VoIP username).

In embodiments, the out-of-band notification takes the form of an SMS message sent to an SMS application 210 on the far-end user terminal 102b. In this case the far-end user terminal 102b is addressed by means of a PSTN phone number of the far-end user terminal 102b instead of the username of the far-end user 106b, and the SMS notification is sent via at least one mobile cellular network of the PSTN network 109.

Alternatively, in embodiments the out-of-band notification takes the form of a push notification sent to the operating system 200 on the far-end user terminal 102b, via the packet-switched network 101 (e.g. Internet). As will be familiar to a person skilled in the art, operating systems and particularly those on mobile devices typically support push notifications, whereby a push notification service operating from a server of this service (not shown) can push a notification to a user's device (as opposed to the user device having to pull the notification from the server). In this case the far-end user terminal 102b is addressed by means of user ID of the far-end user 106b identifying him/her within the push notification service (as opposed to the user ID identifying the far-end user within the packet-switched calling service—the push notification service and the packet-switched calling service using different schemes of user IDs). According to embodiments of the present disclosure, the near-end client 103a can request that the push notifications sends a push notification to the far-end user terminal 102b.

In another alternative embodiment, the out-of-band notification takes the form of an email sent to an email client on the far-end user terminal 102b. In this case the far-end user terminal 102b is addressed by means of an email address of the far-end user 106b instead of his/her user ID within the packet-switched calling service, and the email is sent via an email service of the packet-switched network 101.

In another alternative, the out-of-band notification may be implemented by triggering a missed call in the call log of the dialler application 201 on the far-end terminal 102b. In this case, the notification service (e.g. on the server 104) would request another back-end service to initiate a brief "missed" call to the far-end mobile device's PSTN number, using the call-back number as the Caller ID which can be called back. In embodiments this back-end service may be implemented in the infrastructure 104 of the packet-switched calling service (e.g. VoIP service). Wherever implemented, it works by initiating a normal call, which is then terminated (aborted) immediately after the PSTN network 109 signals back that the far-end device 102b is ringing. This effectively shows up on the far-end telephone device 102b as a "missed" call from the call-back number. Thus this provides an alternative out-of-band notification pathway for a call intent.

By whatever means implemented, the out-of-band call intent notification enables a call to be conducted part way via the PSTN network 109 instead of entirely via the packet-switched network 101. The call intent notification comprises a gateway PSTN number of the near-end user terminal 102a, enabling the far-end user terminal 102b to call back the near-end user terminal 102a by means of a hybrid PSTN/VoIP call: that is, a call conducted only part way over the PSTN network, over a PSTN leg between the far-end user terminal 102b and the gateway 108 and a packet-switched leg between the gateway 108 and the near-end user terminal 102a. Preferably the gateway 108 is local to the far-end user terminal 102b, i.e. in the same geographical pricing region of the PSTN network 109 as the far-end user terminal 102b, such that the PSTN leg of the call amounts only to a local PSTN call for billing purposes.

The call intent notification also comprises a message to the far-end user 106b, which is output through the far-end user terminal 102b upon receipt. The message asks the far-end user 106b to call the near end user 106a using the provided gateway PSTN number. For example, the message may say something along the lines of "Jane would like to speak to you. Call her by local PSTN gateway on the following number: 01234 567890".

The call intent notification may simply present the gateway PSTN number to the far-end user 106b explicitly through the user interface of the far-end user terminal 102b (e.g. on the screen 207), so that the far-end user 106b can manually dial the gateway PSTN number through the dialler application 201. Alternatively, however, the call intent notification may be configured to cause the far-end user terminal 102b, upon receipt, to prompt the far-end user 106b with a user-operable control through the user interface, which the far-end user 106b can select in order to have the far-end user terminal to automatically dial the provided gateway PSTN number. E.g. In the case of an SMS or email, this user-operable control may take the form of a link such as a mobile deep link, which when selected by the far-end user 106b invokes the dialler application 201 to phone the gateway PSTN number provided in the call intent notification. In the case of a push notification, this may work in a similar way in terms of the content and optional link it provides to the far-end user 106b—i.e. the push notification comprises a textual message with the number to call, optionally prompting the far-end user terminal 102b with the number in the form of a user-selectable link (e.g. mobile deep link) which the far-end user 106b can select.

FIG. 3 shows an example of the call-intent notification as appearing to the far-end user 106b on a user interface 300 of the far-end user terminal 102b. The call intent notification triggers a window or dialogue box 302 to be summoned (to "pop up") in the user interface 300, preferably even if the far-end user 106b does not have the packet-based calling application 103 running or in the foreground at the time. Preferably the message 302 will also pop up without the far-end user having to have any particular application open in the foreground at the time. For instance, this would be the case where the out-of-band channel takes the form of an SMS service or push notification service, wherein the operating system 200 is typically configured to automatically alert the user 106b to an incoming SMS or push notification. The message in the dialogue box 302 alerts the far-end user 106b to the fact that the near-end user 106a wishes to establish a call with him/her.

In embodiments, the call intent notification further takes a form configured to cause one or more user operable controls to be presented to the far-end user in the user interface 300, including at least an option 304 to automatically dial the gateway PSTN number provided in the notification. For example, the call intent notification may cause the far-end terminal 102b to present the call-back number in the form of a user-selectable link (e.g. a mobile deep link). When the far-end user 106b selects the link, it automatically invokes the dialler application 201 and passes the call-back PSTN number to the dialler 201, causing the dialler to dial the provided number. In embodiments three controls may also comprise an alternative option 306 to decline to make the call and/or dismiss the notification (e.g. a close-window or dismiss-dialogue-box control). The user operable control(s) 304, 306 may be presented automatically (i.e. may "pop up") along with the dialogue box 302. Alternatively, the user may have to select the notification to summon the controls 304, 306. For example, if the out-of-band channel comprises SMS or email, the operating system 200 may prompt the user with an indication that a message is received, perhaps showing the first few words of the SMS, but the far-end user 106b will have to select to read the SMS or email in order to access the link 304 to the gateway PSTN number.

The PSTN number inserted into the call intent notification is a gateway PSTN number mapped to the user ID of the near-end user 106a in the gateway phone number database 110. Thus when the far-end client 103a dials the gateway PSTN number, a reverse call is established call by being routed via the gateway 108, such that the leg between the gateway 108 and the near-end user terminal 102a is still over the packet-switched network 101, as discussed previously.

In some cases, the near-end user 106a may have a permanent gateway PSTN number already mapped to his or her user ID in the database 110. However, gateway PSTN numbers are a finite resource: there are far fewer available than there are users of a typical VoIP service. Hence a user has to pay to own a permanent gateway PSTN number. If the near-end user 106a does indeed have the luxury of owning such a number, then this may simply be inserted into the call intent notification sent to the far end. However, if the near-end user 106a does not have a permanent PSTN number, then the near-end client 103a may instead request that a gateway PSTN number is temporarily allocated to the far-end user 106a in the database 110.

To do this the near-end client 103a contacts the database 110 on the server 104, to submit a request comprising the user ID of the near-end user 106b (the user ID that identifies him or her within the packet-switched communication service in question, e.g. the VoIP service). In response, if a spare gateway PSTN number is currently available, the database 110 allocates one of the spare gateway PSTN numbers to the near-end user 106a by mapping this gateway PSTN to his or her user ID. The database 110 also returns this PSTN number to the near-end client 103a. The near-end client 103a then includes the returned PSTN number in the call intent notification, to enable the far-end user terminal 102b to establish the hybrid call with the near-end user terminal 102a via the gateway 108.

The temporary gateway PSTN number remains allocated to the near-end user 106a at least for the duration of call, then is relinquished again after the call is finished (to be available to be allocated to another user). E.g. one of the near-end or far-end clients 103a, 103b, or the gateway 108, may be configured to send a signal to the database 110 upon termination of the call, triggering the database 110 to de-allocate the temporary gateway PSTN number from the near-end user 106a at the end of the call. Alternatively, the database 110 may be configured to automatically de-allocate the temporary gateway PSTN number after a predetermined time period has elapsed since the allocation, the time period being set to be long enough that it is reasonable to assume the call would have finished (e.g. >=3 hours). Alternatively, the temporary gateway PSTN number may remain allocated for a longer time period, e.g. a week or a month, so that it can be used repeatedly by the far-end user 106b without needing to change the number. In embodiments, an expiration period is included in the database 110, which is automatically extended whenever the same far-end user 106b is using the mapping, e.g. making a call.

Furthermore, in embodiments the mapping 110 provided by the gateway 108 may in fact be a three-piece mapping. As mentioned, the availability of PSTN numbers to be used as gateway numbers is typically limited—there are typically many usernames registered for a VoIP service, and not enough PSTN numbers to allocate one to every username (given that the majority of the PSTN numbers are already claimed or reserved for PSTN phones). In fact, there may not even be enough PSTN numbers available to allow even a temporary mapping that is unique to a given username for each of the users currently requiring a temporary gateway PSTN number. Hence in embodiments, the mapping in the gateway 108 in fact maps a gateway PSTN number to a unique pair of caller PSTN number and callee username (thus each entry in the database 110 comprises three elements). I.e. it is a pairing of sender and recipient (near-end and far-end user 106a, 106b) that maps to a given gateway PSTN number. This way the same gateway PSTN number can be re-used for a different caller-callee pair. So if a different caller calls the same gateway PSTN number, then this maps to a different callee.

To obtain the address to which to send the out-of-band call intent notification (e.g. to obtain the destination PSTN number for sending the notification by SMS, or to obtain a destination email address to send the notification by email), in embodiments the near-end client application 103a may be configured to look up the address (e.g. PSTN no. or email address) of the far-end user terminal 102b in a profile of the far-end user 106b, for instance a profile of the far-end user 106b associated with the packet-switched communication service being used (e.g. the particular VoIP service in question). Typically, a communication service such as a VoIP service will store a profile of each of its users in the server 104, and hence this will include a profile of the far-end user 106b. The profile may include information such as an avatar image, mood message, hometown, etc., of the respective user. Another piece of information user typically include in their profile is an alternative address such as a PSTN phone number or email address, via which they can be contacted outside of the packet-switched communication service (e.g. VoIP service). The profile, or selected items in the profile, may be made available to all other users of the communication service in question; or the profile, or selected items in it, may only be available to certain users which the user whose profile it is has selected as contacts. Either way, assuming the near-end user 106a is a contact of the far-end user 106b, then the near-end client 103a will be able to look up an address of the far-end user 106b such as a PSTN number or email address in his or her profile, and to send the call intent notification to this address.

The above has been described in terms of a client-side implementation. However, a server side implementation is also possible. For instance, instead of the client application 103a, 103b being installed on the respective user terminal 102a, it is equivalently possible that one or both of the first and second user terminals 102a, 102b accesses a server-hosted instance of the client 103 in order to provide the same functionality. For instance, one or both of the first and second user terminals 102a, 102b may access a web-hosted instance of the client 103 via a general purpose web browser installed on the respective user terminal. Further, whether a client-side or web-hosted instance of the client 103 is used, it is also possible that part or all of the mechanism for sending the call intent notification may be implemented on the server 104. For example the server 104 may be arranged so that, when the near-end user 106a attempts to initiate a packet-switched call (e.g. VoIP call) with the far-end user 106b, the server 104 detects whether or not the second user terminal 102b and/or second user 106a is available to take a packet-switched call; and if not, the server 104 instead sends the out-of-band call notification by means of an out-of-band channel between the server 104 and the far-end user terminal 102a, e.g. by SMS or push notification. Indeed, even when the detection is performed at the near-end client side 103a, the near-end client 104 may still invoke the services of the server 104, or a server of another party, in order to send the out-of-band call intent notification. For instance, when the call intent notification is a push notification sent to the operating system 200 on the far-end terminal 102b, then the near-end client will typically make use of a push notification server providing the push notification service (this server typically being provided by the provider of the operating system, rather than being the server 104 of the VoIP service or other such packet-switched calling service).

It will be appreciated that the above embodiments have been described only by way of example.

More generally, according to one aspect of the present disclosure, there is provided equipment for use in relation to a communication service for establishing a packet-switched call between a first user terminal and a second user terminal over a packet-switched network, the first user terminal being used by a first user and the second user terminal being used by a second user; the equipment comprising an interface for sending a notification to the second user terminal via an out-of-band communication channel not involving said communication service; memory comprising one or more memory units, the memory storing code; and processing apparatus comprising one or more processing units, the processing apparatus being arranged to run the code from said memory, wherein the code is configured so as when run on the processing apparatus to perform operations of: receiving an indication that the first user intends a call with the second user via said communication service; in response to the receipt of said indication, determining whether the second user terminal is currently unavailable to answer a call through said communication service, and/or determining whether the second user is currently unavailable to answer a call through said communication service; in response to the receipt of said indication combined with the second user terminal or the second user being unavailable according to said determination, sending a call intent notification to the second user terminal via said out-of-band communication channel, the call-intent notification notifying the second user about the intended call; and including in the notification a gateway PSTN number enabling the second user terminal to establish a hybrid PSTN call with the first user terminal via a connection between the second user terminal and a gateway over a PSTN network, and via a connection between the gateway and the first user terminal over the packet-switched network using said packet-switched communication service.

In embodiments, the code may be configured to send said notification in a form configured to cause the second user terminal to prompt the second user with a far-end user control, which when actuated by the second user establishes the hybrid call to the first user terminal based on the gateway PSTN number without requiring manual dialling of the gateway PSTN number.

In embodiments, the code may be configured so as when run on the processing apparatus to: further include in said notification an instruction to the second user terminal causing the second user terminal to prompt the second user with a message inviting the second user to dial the gateway PSTN number.

In embodiments, said indication may comprise the first user attempting to make a fully packet-switched outgoing call to the second user.

In embodiments, said determination may comprise the determination as to whether the second user is available, and the code may be configured to perform said determination by: detecting when the second user has not answering the outgoing call after a predetermined time.

In embodiments, the code may be configured so as when run on the processing apparatus to perform operations of: presenting a message to the first user through the first user terminal, the message indicating the determined availability of the second user terminal and/or second user, and suggesting the sending of the call intent notification; and providing a near-end user control to the first user through the first user terminal, the near-end user control being for triggering the sending of the call-intent notification; wherein said indication may comprise actuation of the near-end user control by the first user.

In embodiments, said determination may comprise the determination as to whether the second user terminal is available, and the code may be configured to perform said determination by: detecting that no user terminal of the second user is currently registered with the communication service.

In embodiments the code may comprise a first instance of a communication client application configured to perform said determination and said sending and to receive the call from the second user terminal and gateway; and the first instance of the communication client application may also be operable, on another occasion when the second user terminal and the user of the second user terminal are available to answer a call through said communication service, to establish a fully packet-switched call with a second instance of the communication client via the packet-switched network using said communication service. In such embodiments, the out-of-band communication channel may be a channel to a program on the second user terminal other than an instance of said communication client application.

In embodiments, the code may comprise a first instance of a communication client application configured to perform said determination and said sending and to receive the call from the second user terminal and gateway; wherein the first instance of the communication client application may also be operable, on another occasion when the second user terminal and the user of the second user terminal are available to answer a call through said communication service, to establish a fully packet-switched call with the second user terminal via the packet-switched network using said communication service, based on a username of the second user identifying the second user within the packet-switched communication service. In such embodiments, the out-of-band communication channel may address the second user by means of an address other than the username of the second user.

In embodiments, said communication service may be provided by a provider, and the out-of-band channel may be provided by a party other than the provider of said communication service.

In embodiments, the out-of-band communication channel may be SMS and the call intent notification may take the form of a SMS message.

In embodiments, the out-of-band communication channel may be a push notification service of an operating system of the second user terminal, and the call intent notification may take the form of a push notification.

In embodiments, the out-of-band communication channel may be an email service, and the call intent notification may take the form of an email.

In embodiments, the out-of-band communication channel may be the PSTN network, and the call intent notification may be provided by triggering a missed PSTN call in a call log on the second user terminal.

In embodiments, the code may be configured to obtain only a temporary allocating of the gateway PSTN number to the first user terminal, the gateway PSTN number being released for use by another user terminal upon termination of the hybrid call between the second user terminal and the first user terminal, or upon expiry of a predetermined time-out period following the hybrid call.

In embodiments the packet-switched network may comprise an IP based network, and the communication service may comprise a VoIP service.

In embodiments said equipment may be implemented at least in part on a server.

In embodiments said equipment is implemented at least in part in the first user terminal.

According to another aspect disclosed herein, there is provided a system comprising the equipment of any preceding claim and the second user terminal.

In embodiments, the PSTN network may be divided into different geographical regions whereby a PSTN call between different ones of the regions incurs a higher cost than a call conducted locally within one of the regions; and the gateway is preferably included in the same one of said geographic regions as the second user terminal such that the hybrid call only incurs the cost of a local call.

According to another aspect disclosed herein, there is provided a method performed in relation to a communication service for establishing a packet-switched call between a first user terminal and a second user terminal over a packet-switched network, the first user terminal being used by a first user and the second user terminal being used by a second user; the method comprising: receiving an indication that the first user intends a call with the second user via said communication service; in response to the receipt of said indication, determining whether the second user terminal is currently unavailable to answer a call through said communication service, and/or determining whether the second user is currently unavailable to answer a call through said communication service; in response to the receipt of said indication combined with the second user terminal or the second user being unavailable according to said determination, sending a call intent notification to the second user terminal via said out-of-band communication channel, the call-intent notification notifying the second user about the intended call; and including in the notification a gateway PSTN number enabling the second user terminal to establish a hybrid PSTN call with the first user terminal via a connection between the second user terminal and a gateway over a PSTN network, and via a connection between the gateway and the first user terminal over the packet-switched network using said communication service.

According to another aspect disclosed herein, there is provided a computer-program product for use in relation to a communication service for establishing a packet-switched call between a first user terminal and a second user terminal over a packet-switched network, the first user terminal being used by a first user and the second user terminal being used by a second user; the computer program product comprising code embodied on computer-readable storage and configured so as when run on a server or the first user terminal, or a combination thereof, to perform operations of: receiving an indication that the first user intends a call with the second user via said communication service; in response to the receipt of said indication, determining whether the second user terminal is currently unavailable to answer a call through said communication service, and/or determining whether the second user is currently unavailable to answer a call through said communication service; in response to the receipt of said indication combined with the second user terminal or the second user being unavailable according to said determination, sending a call intent notification to the second user terminal via said out-of-band communication channel, the call-intent notification notifying the second user about the intended call; and including in the notification a gateway PSTN number enabling the second user terminal to establish a hybrid PSTN call with the first user terminal via a connection between the second user terminal and a gateway over a PSTN network, and via a connection between the gateway and the first user terminal over the packet-switched network using said packet-switched communication service.

Other variants or use case may be apparent to a person skilled in the art given the disclosure herein. The scope of the present disclosure is not limited by the above embodiments but only by the accompanying claims.

In the discussions herein, various different embodiments are described. It is to be appreciated and understood that each embodiment described herein can be used on its own or in connection with one or more embodiments described herein. Further aspects of the techniques discussed herein relate to one or more of the following embodiments.

Equipment for use in relation to a communication service for establishing a packet-switched call between a first user terminal and a second user terminal over a packet-switched network, the first user terminal being used by a first user and the second user terminal being used by a second user; the equipment comprising: an interface for sending a notification to the second user terminal via an out-of-band communication channel not involving said communication service; memory comprising one or more memory units, the memory storing code; and processing apparatus comprising one or more processing units, the processing apparatus being arranged to run the code from said memory, wherein the code is configured so as when run on the processing apparatus to perform operations of: receiving an indication that the first user intends a call with the second user via said communication service; in response to the receipt of said indication, determining whether the second user terminal is currently unavailable to answer a call through said communication service, and/or determining whether the second user is currently unavailable to answer a call through said communication service; in response to the receipt of said indication combined with the second user terminal or the second user being unavailable according to said determination, sending a call intent notification to the second user terminal via said out-of-band communication channel, the call-intent notification notifying the second user about the intended call; and including in the notification a gateway PSTN number enabling the second user terminal to establish a hybrid PSTN call with the first user terminal via a connection between the second user terminal and a gateway over a PSTN network, and via a connection between the gateway and the first user terminal over the packet-switched network using said packet-switched communication service, the code is configured to send said notification in a form configured to cause the second user terminal to prompt the second user with a far-end user control, which when actuated by the second user establishes the hybrid call to the first user terminal based on the gateway PSTN number without requiring manual dialling of the gateway PSTN number, the code is configured so as when run on the processing apparatus to: further include in said notification an instruction to the second user terminal causing the second user terminal to prompt the second user with a message inviting the second user to dial the gateway PSTN number, said indication comprises the first user attempting to make a fully packet-switched outgoing call to the second user, said determination comprises the determination as to whether the second user is available, and the code is configured to perform said determination by: detecting when the second user has not answering the outgoing call after a predetermined time, the code is configured so as when run on the processing apparatus to perform operations of: presenting a message to the first user through the first user terminal, the message indicating the determined availability of the second user terminal and/or second user, and suggesting the sending of the call intent notification; and providing a near-end user control to the first user through the first user terminal, the near-end user control being for triggering the sending of the call-intent notification; wherein said indication comprise actuation of the near-end user control by the first user, said determination comprises the determination as to whether the second user terminal is available, and the code is configured to perform said determination by: detecting that no user terminal of the second user is currently registered with the communication service, the code comprises a first instance of a communication client application configured to perform said determination and said sending and to receive the call from the second user terminal and gateway; the first instance of the communication client application also being operable, on another occasion when the second user terminal and the user of the second user terminal are available to answer a call through said communication service, to establish a fully packet-switched call with a second instance of the communication client via the packet-switched network using said communication service; and wherein the out-of-band communication channel is a channel to a program on the second user terminal other than an instance of said communication client application, the code comprises a first instance of a communication client application configured to perform said determination and said sending and to receive the call from the second user terminal and gateway; the first instance of the communication client application also being operable, on another occasion when the second user terminal and the user of the second user terminal are available to answer a call through said communication service, to establish a fully packet-switched call with the second user terminal via the packet-switched network using said communication service, based on a username of the second user identifying the second user within the packet-switched communication service; and wherein the out-of-band communication channel addresses the second user by means of an address other than the username of the second user, said communication service is provided by a provider, and the out-of-band channel is provided by a party other than the provider of said communication service, the out-of-band communication channel is SMS and the call intent notification takes the form of a SMS message, the out-of-band communication channel is a push notification service of an operating system of the second user terminal, and the call intent notification takes the form of a push notification, the out-of-band communication channel is an email service, and the call intent notification takes the form of an email, the out-of-band communication channel is the PSTN network, and the call intent notification is provided by triggering a missed PSTN call in a call log on the second user terminal, code is configured to obtain only a temporary allocating of the gateway PSTN number to the first user terminal, the gateway PSTN number being released for use by another user terminal upon termination of the hybrid call between the second user terminal and the first user terminal, or upon expiry of a predetermined time-out period following the hybrid call, the packet-switched network comprises an IP based network, and the communication service comprises a VoIP service, the equipment is implemented at least in part on a server, the equipment is implemented at least in part in the first user terminal.

A method performed in relation to a communication service for establishing a packet-switched call between a first user terminal and a second user terminal over a packet-switched network, the first user terminal being used by a first user and the second user terminal being used by a second user; the method comprising: receiving an indication that the first user intends a call with the second user via said communication service; in response to the receipt of said indication, determining whether the second user terminal is currently unavailable to answer a call through said communication service, and/or determining whether the second user is currently unavailable to answer a call through said communication service; in response to the receipt of said indication combined with the second user terminal or the second user being unavailable according to said determination, sending a call intent notification to the second user terminal via said out-of-band communication channel, the call-intent notification notifying the second user about the intended call; and including in the notification a gateway PSTN number enabling the second user terminal to establish a hybrid PSTN call with the first user terminal via a connection between the second user terminal and a gateway over a PSTN network, and via a connection between the gateway and the first user terminal over the packet-switched network using said communication service.

A computer-program product for use in relation to a communication service for establishing a packet-switched call between a first user terminal and a second user terminal over a packet-switched network, the first user terminal being used by a first user and the second user terminal being used by a second user; the computer program product comprising code embodied on computer-readable storage and configured so as when run on a server or the first user terminal, or a combination thereof, to perform operations of: receiving an indication that the first user intends a call with the second user via said communication service; in response to the receipt of said indication, determining whether the second user terminal is currently unavailable to answer a call through said communication service, and/or determining whether the second user is currently unavailable to answer a call through said communication service; in response to the receipt of said indication combined with the second user terminal or the second user being unavailable according to said determination, sending a call intent notification to the second user terminal via said out-of-band communication channel, the call-intent notification notifying the second user about the intended call; and including in the notification a gateway PSTN number enabling the second user terminal to establish a hybrid PSTN call with the first user terminal via a connection between the second user terminal and a gateway over a PSTN network, and via a connection between the gateway and the first user terminal over the packet-switched network using said packet-switched communication service.

What is claimed is:

1. A system comprising:
    a processing apparatus; and
    memory storing code that is executable by the processing apparatus to perform operations including:
        receiving an indication that a first user performs an action on a first user terminal to initiate a call with a second user of a second user terminal and via a communication service;
        determining one or more of that the second user terminal is currently unavailable to answer a call through said communication service, or that the second user is currently unavailable to answer a call through said communication service;
        sending, automatically and responsive to said determining, a call intent notification to the second user terminal via an out-of-band communication channel that is separate from the communication service; and
        including in the notification a Public Switched Telephone Network (PSTN) number enabling the second user terminal to initiate a PSTN call with the first user terminal using the PSTN number and via a connection between the first and second user terminals over a PSTN network.

2. The system of claim 1, wherein said sending comprises sending said notification to enable the second user terminal to provide a prompt with a control that is actuatable to establish the PSTN call to the first user terminal based on the PSTN number without requiring manual dialing of the PSTN number at the second user terminal.

3. The system of claim 1, wherein the notification includes an instruction to the second user terminal to enable the second user terminal to provide a prompt inviting the second user to dial the PSTN number.

4. The system of claim 1, wherein said determining is based on detecting that the second user terminal does not answer the call from the first user terminal after a predetermined time.

5. The system of claim 1, wherein said determining is based on detecting that the second user terminal is currently not registered with the communication service.

6. The system of claim 1, wherein the action on the first user terminal to initiate a call comprises a user interaction with a first application on the first user terminal, and wherein the out-of-band communication channel involves a second application on the first user terminal.

7. The system of claim 1, wherein the communication service is provided by a first service provider, and wherein the out-of-band communication channel is provided by a second service provider.

8. The system of claim 1, wherein the out-of-band communication channel comprises one or more of an instant message from the first user terminal, or an email from the first user terminal.

9. The system of claim 1, wherein the PSTN number enables the PSTN call to be established via a connection between the second user terminal and a PSTN gateway, and wherein the operations further include causing the PSTN number to be released for user by another user terminal after termination of the PSTN call.

10. The system of claim 1, wherein the PSTN number enables the PSTN call to be established via a connection between the second user terminal and a PSTN gateway, and wherein the operations further include causing the PSTN number to be released for user by another user terminal after expiry of a predetermined time-out period after termination of the PSTN call.

11. A method comprising:
receiving an indication that a first user performs an action on a first user terminal to initiate a call with a second user of a second user terminal and via a communication service;
determining one or more of that the second user terminal is currently unavailable to answer a call through said communication service, or that the second user is currently unavailable to answer a call through said communication service;
sending, automatically and responsive to said determining, a call intent notification to the second user terminal via an out-of-band communication channel that is separate from the communication service; and
including in the notification a Public Switched Telephone Network (PSTN) number enabling the second user terminal to initiate a PSTN call with the first user terminal using the PSTN number and via a connection between the first and second user terminals over a PSTN network.

12. The method of claim 11, wherein said sending comprises sending said notification to enable the second user terminal to provide a prompt with a control that is actuatable to establish the PSTN call to the first user terminal based on the PSTN number without requiring manual dialing of the PSTN number at the second user terminal.

13. The method of claim 11, wherein the notification includes an instruction to the second user terminal to enable the second user terminal to provide a prompt inviting the second user to dial the PSTN number.

14. The method of claim 11, wherein said determining is based on detecting that the second user terminal is currently not registered with the communication service.

15. The method of claim 11, wherein the action on the first user terminal to initiate a call comprises a user interaction with a first application on the first user terminal, and wherein the out-of-band communication channel involves a second application on the first user terminal.

16. The method of claim 11, wherein the communication service is provided by a first service provider, and wherein the out-of-band communication channel is provided by a second service provider.

17. The method of claim 11, wherein the PSTN number enables the PSTN call to be established via a connection between the second user terminal and a PSTN gateway, and wherein the method further comprises causing the PSTN number to be released for user by another user terminal after termination of the PSTN call.

18. A computer-readable memory storing code that is executable by a processor to perform operations comprising:
receiving an indication that a first user performs an action on a first user terminal to initiate a call with a second user of a second user terminal and via a communication service;
determining one or more of that the second user terminal is currently unavailable to answer a call through said communication service, or that the second user is currently unavailable to answer a call through said communication service;
sending, automatically and responsive to said determining, a call intent notification to the second user terminal via an out-of-band communication channel that is separate from the communication service; and
including in the notification a Public Switched Telephone Network (PSTN) number enabling the second user terminal to initiate a PSTN call with the first user terminal using the PSTN number and via a connection between the first and second user terminals over a PSTN network.

19. The computer-readable memory of claim 18, wherein said sending comprises sending said notification to enable the second user terminal to provide a prompt with a control that is actuatable to establish the PSTN call to the first user terminal based on the PSTN number without requiring manual dialing of the PSTN number at the second user terminal.

20. The computer-readable memory of claim 18, wherein the notification includes an instruction to the second user terminal to enable the second user terminal to provide a prompt inviting the second user to dial the PSTN number.

* * * * *